United States Patent [19]

Chang et al.

[11] Patent Number: 4,765,873
[45] Date of Patent: Aug. 23, 1988

[54] CONTINUOUS PROCESS FOR THE REMOVAL OF HYDROGEN SULFIDE FROM A GASEOUS STREAM

[75] Inventors: Dane Chang, Houston; Michael C. McGaugh, Angleton, both of Tex.

[73] Assignee: The Dow Chemical Company, Midland, Mich.

[21] Appl. No.: 805,671

[22] Filed: Dec. 6, 1985

[51] Int. Cl.$^4$ .................. C01B 17/16; C01B 17/02; C25B 1/00; C25B 1/02
[52] U.S. Cl. .................................................. 204/101
[58] Field of Search .................. 423/234, 571, 356; 204/101, 129

[56] References Cited

U.S. PATENT DOCUMENTS

| | | | |
|---|---|---|---|
| 3,249,522 | 5/1966 | Bolmer | 204/101 |
| 3,409,520 | 11/1968 | Bolmer | 204/101 |
| 3,627,465 | 12/1971 | Hamblin | 423/356 |
| 3,715,426 | 2/1973 | Hamblin | 204/101 |
| 3,728,440 | 4/1973 | Hamblin | 204/101 |
| 4,038,366 | 6/1977 | Fukuda et al. | 423/234 |
| 4,041,129 | 8/1977 | Foster et al. | 423/234 |
| 4,342,731 | 8/1982 | Ritter | 204/101 |
| 4,518,572 | 5/1985 | Ritter | 204/101 |

Primary Examiner—John Doll
Assistant Examiner—Lori S. Freeman
Attorney, Agent, or Firm—A. E. Pierce

[57] ABSTRACT

A process for removing hydrogen sulfide from a gaseous stream containing hydrogen sulfide by contacting said stream with an aqueous solution of ammonium hydroxide to produce ammonium sulfide; converting said ammonium sulfide to an ammonium polysulfide intermediate in an electrolytic cell at ambient temperature and pressure; and oxidizing said ammonium polysulfide to sulfur in a heating zone utilizing an oxygen containing gas sparge.

8 Claims, 1 Drawing Sheet

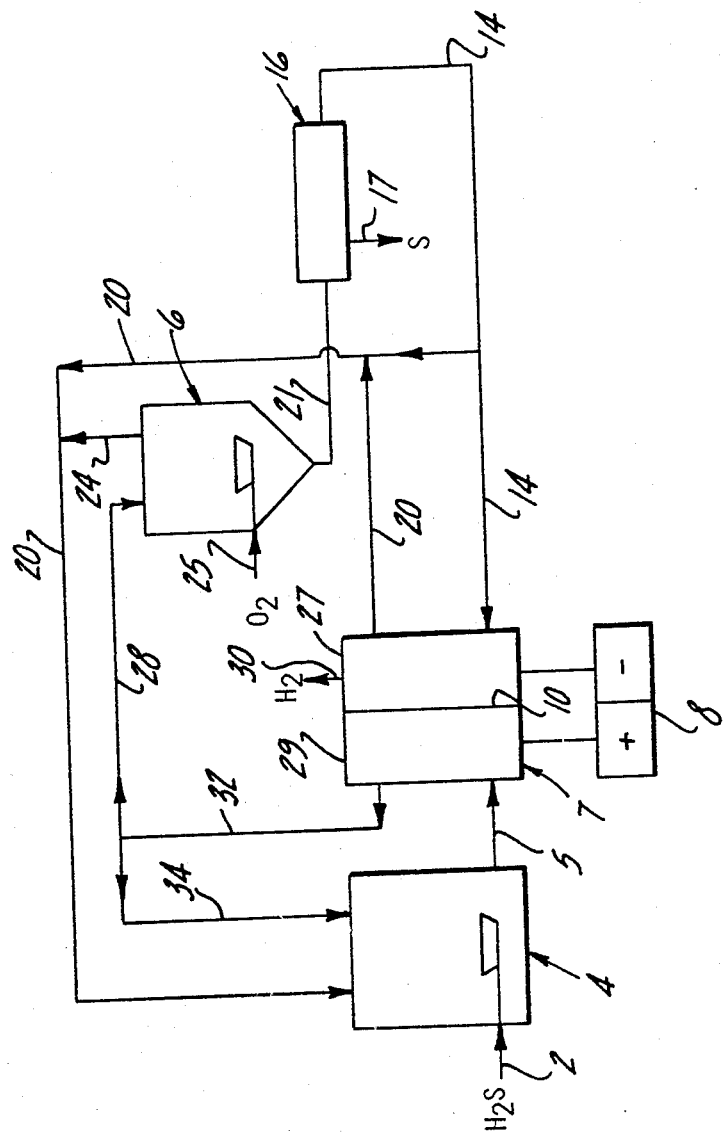

CONTINUOUS PROCESS FOR THE REMOVAL OF HYDROGEN SULFIDE FROM A GASEOUS STREAM

BACKGROUND OF THE INVENTION

(1) Field of the Invention

The present invention relates to a continuous process for the removal of hydrogen sulfide from a gaseous stream; the conversion of sulfide to polysulfide in an electrolytic cell; and the production of sulfur in a heating zone.

(2) Description of the Prior Art

The removal of $H_2S$ from a gas stream is a problem that has long confronted and challenged workers in many diverse industries. One example is in the natural gas industry where the $H_2S$ content of certain gas streams recovered from natural gas deposits in many areas of the world is often too high for commercial acceptance. Another example is in the manufactured gas industry or the coke-making industry where coal gas containing unacceptable amounts of $H_2S$ is commonly produced by the descructive distillation of bituminous coal having a high sulfur content. Yet another example is found in the manufacture of water gas or synthesis gas where it is not unusual to produce gas streams containing $H_2S$ by passing steam over a bed of incandescent coke or coal containing a minor amount of sulfur.

More frequently, this problem is encountered in the petroleum refining industry because the principal raw material used, crude oil, typically contains a minor amount of sulfur—principally in the form of organic sulfur compounds. During the course of the many processes to which the crude oil or fractions thereof are subjected, one or more gas streams containing $H_2S$ are quite commonly produced. For example, in many cases one of the product streams from a hydrocarbon conversion process is a gas stream containing $H_2S$ in admixture with hydrogen and/or with light normally gaseous hydrocarbons mainly, $C_1$–$C_3$. As is well known in the art, the presence of $H_2S$ in these refinery gas streams can cause a number of detrimental problems in subsequent processing steps such as: corrosion of process equipment, deterioration and deactivation of catalysts, undesired side reactions, increases in process pressure requirements, increase in gas compressor capacity, etc.

Regardless of the source of the gas stream containing $H_2S$, the problem of removing $H_2S$ therefrom has been solved in a number of different ways which generally involve one or more of the following techniques: selective absorption with a wide variety of absorbents, adsorption by a suitable adsorbent, selective reaction with a reagent which produces an easily separable product, etc. The details of these techniques are well known to those skilled in the art. One old and well-known solution to this $H_2S$ removal problem involves scrubbing the gas stream with an ammoniacal aqueous solution. For example, in Germany the perox process, which uses ammonia scrubbing, has been widely used for coal gas purification. Despite the considerable amount of effort that has been devoted to developing an acceptable solution to this problem involving scrubbing with an ammoniacal solution, the use of ammoniacal scrubbing has not been universally accepted in the gas treating art as the preferred method for removing $H_2S$ from a gas stream primarily because of a number of operational difficulties associated with its implementation. One difficulty involves the relatively high partial pressure of ammonia at preferred scrubbing temperatures which generally requires that the scrubbing step be conducted with a relatively dilute ammonia solution or under relatively high pressure. The use of a dilute scrubbing solution in turn quite commonly forces the addition of a separate water wash step after the ammonia scrubbing step in order to remove ammonia from the treated gas stream. In addition, the use of dilute scrubbing solutions typically increases substantially the regeneration costs where the regeneration step is conducted at a considerably higher temperature than the scrubbing step, although some of this heat load can be recovered by a suitable heat exchanging procedure. Another difficulty is associated with the regeneration of the rich absorbent solution withdrawn from the $H_2S$-scrubbing step. In order to minimize the requirements of the scrubbing step for water and ammonia, it is necessary to remove sulfide from this rich absorbent. Several regeneration procedures have been proposed but they typically have involved the use of absorbent-soluble catalysts such as hydroquinone and have had problems such as contamination of the sulfur product with the catalyst, excessive formation of undesired by-products such as ammonium sulfate and thiosulfate and loss of scrubbing solution and catalyst during the periodic purges that are generally required to remove side products from the system. Other difficulties have been associated with the recovery of the elemental sulfur from the regeneration step. In some processes it has been customary to form a froth of sulfur in the absorbent regeneration vessel which then must be skimmed off and filtered. In short, it is clear that there are a significant number of technical problems associated with the prior art methods for removing $H_2S$ from a gas stream by the method of scrubbing with an ammoniacal solution.

In U.S. Pat. No. 3,409,520, a process is disclosed for the removal of hydrogen sulfide from a hydrogen sulfide/hydrocarbon gas mixture using an electrolytic cell having a basic electrolyte. The base can have a cation selected from the group consisting of sodium, potassium, and ammonium ions. Free sulfur or polysulfide products are produced in the anode compartment of the electrolytic cell. In this process, the hydrogen sulfide present in a gaseous stream is fed directly to the porous anode of the electrolytic cell.

In U.S. Pat. No. 3,249,522, hydrogen sulfide contained in a gaseous stream is utilized as a feed gas in a fuel cell. The gaseous stream is fed directly to a porous anode of an electrochemical cell containing a basic electrolyte. The base can have a cation selected from the group consisting of sodium, potassium, and ammonium ions. Free sulfur is formed in the anode compartment of the cell. A sulfur solvent can be utilized to prevent clogging the pores of the porous anode with sulfur.

In U.S. Pat. No. 4,342,731, a method is dislosed for removing hydrogen sulfide from coke oven gas utilizing an ammonia scrubber and in U.S. Pat. No. 3,715,426, a continuous process is disclosed for scrubbing hydrogen sulfide from a gas stream and selectively producing elemental sulfur wherein the hydrogen sulfide is scrubbed from the gaseous stream utilizing an aqueous solution of ammonium hydroxide.

SUMMARY OF THE INVENTION

In accordance with the present invention, it has now been found that hydrogen sulfide can be removed from a hydrogen sulfide/gas mixture and converted to a sulfur product in a continuous process. The hydrogen sulfide is removed from said gas mixture in a contact zone in which an aqueous solution of ammonium hydroxide at a pH of 12 or above is utilized to absorb the hydrogen sulfide and convert it to an ammonium sulfide intermediate product. Thereafter, the enriched aqueous solution of ammonium sulfide, ammonium hydroxide, and hydrogen sulfide is introduced into the anode compartment of an electrolytic cell operated at ambient temperature and pressure containing an anode and anolyte in said anode compartment, a cell membrane, and a cathode and catholyte in a cathode compartment. The catholyte comprises ammonium hydroxide. An ammonium polysulfide and sulfur mixture with ammonium polysulfide predominating, is produced at the anode of said cell upon passing an electric current through said cell. Hydrogen is produced at the cathode and removed. An aqueous solution of ammonium hydroxide is produced in the catholyte. The anolyte containing ammonium polysulfide (the second enriched aqueous solution) is introduced into a heating zone generally maintained at the boiling point of said second enriched aqueous solution, said heating zone being provided with a sparging stream of an oxygen containing gas. In addition to converting the ammonium polysulfide to sulfur in said heating zone, ammonia and hydrogen sulfide, also contained in said aqueous solution, are removed and recycled to the contact zone together with the ammonium hydroxide catholyte. The electrolyte contained in the anolyte compartment of the electrolytic cell has a pH of at least 12 in order to insure that the major portion of the sulfur product mixture produced at the anode is ammonium polysulfide. Preferably the pH is above 14. At a pH below 12, there is a greater tendency for sulfur to be formed at the anode rather than ammonium polysulfide. Formation of insoluble sulfur in the electrolytic cell is undesirable since it tends to coat the surface of a nonporous anode or block up the pores of a porous anode.

BRIEF DESCRIPTION OF THE DRAWING

The drawing shows in schematic form a preferred embodiment of the invention wherein hydrogen sulfide in admixture with another gas is fed to a contact zone 4 containing an aqueous solution of ammonium hydroxide. Thereafter, the aqueous solution is fed to an electrolytic cell 7 and the ammonium polysulfide produced at the anode of said cell is fed to a heating zone 6 supplied with an oxygen containing gas in order to reduce the time for the oxidation of ammonium polysulfide to sulfur. The sulfur is removed, such as by filtering, and the aqueous solution together with hydrogen sulfide and ammonia are evaporated from the heating zone and recycled to the contact zone 4.

DETAILED DESCRIPTION OF THE INVENTION

In the process of the invention an aqueous alkaline solution of ammonium hydroxide is utilized in a contact zone maintained at ambient temperature and pressure for the removal of hydrogen sulfide from the gas mixture. The aqueous alkaline solution comprising ammonium sulfide produced in the contact zone is fed to the anolyte compartment of an electrolytic cell wherein it is maintained at a pH of at least 12. Upon the application of a direct electric current of sufficient voltage applied across the electrodes of the electrolytic cell, with an ammonium hydroxide solution acting as the catholyte, ammonium polysulfide is produced at the anode of the cell. In the process of the invention, about 75 to 99% by weight of the anolyte is withdrawn from the cell for recycling to the contact zone. The ammonium polysulfide is oxidized to elemental sulfur in a heating zone, preferably maintained at about 85° centigrade to about 125° centigrade, which is supplied with a sparging stream of an oxygen containing gas to assist in the oxidation. After removal of the elemental sulfur produced in the heating zone, the remaining aqueous liquid is recycled to the contact zone together with any hydrogen sulfide and ammonia removed from the heating zone during the oxidation of the ammonium polysulfide. During the electrolysis, hydrogen and hydroxide ions are produced at the cathode according to equation (1):

$$2 H_2O + 2e \rightarrow H_2 \uparrow + 2 OH^- \qquad (1)$$

and ammonium ion produced in the anolyte compartment of the electrolysis cell migrates through the cell membrane to the catholyte compartment and forms ammonium hydroxide by reaction with the hydroxide ion produced therein as shown in equation (1).

The efficient formation of amonium polysulfide requires an electrolyte having a relatively high pH of at least 12. Therefore, the pH of the contact zone of the process and of the electrolysis cell electrolyte is maintained at said pH by the addition of ammonium hydroxide from the electrolytic cell. Both the contact zone and the electrolysis cell are operated at ambient temperature and pressure. The maintenance of the pH at at least 12 insures that a product consisting of a major proportion of ammonium polysulfide is produced at the anode of the electrolytic cell thereby substantially avoiding the tendency of sulfur to clog the pores of a porous anode or coat the surface of a nonporous anode. However, the anode need not be porous and can be made of other materials such as titanium, nickel, platinum, and stainless steel. Similarly, the cathode can be porous, for instance, porous graphite but other materials can be utilized such as those described for the anode.

The electrolytic cell is preferably equipped with a cell membrane of the permselective membrane type so as to allow ammonium ion to transfer through the membrane from the anolyte compartment to the catholyte compartment. The reaction in the catholyte compartment of the cell is the electrolysis of water to produce hydrogen and hydroxide ions. The hydroxide ions combined with the ammonium ion produce an enriched aqueous solution of ammonium hydroxide. The ammonium hydroxide solution, utilized as the catholyte in the electrolysis cell, upon enrichment with additional hydroxide ions, as the result of the electrolysis process, is recycled to the contact zone to insure that a pH of at least 12 is maintained therein. Recycling of the hydroxide ion enriched ammonium hydroxide solution insures that the absorption of hydrogen sulfide in the contact zone does not progressively lower the pH of the aqueous solution of ammonium hydroxide. The maintenance of the pH of the aqueous solution in the contact zone and the pH of the anolyte at the desired pH of 12 or more is a novel feature of the invention which eliminates or reduces the need for additional ammonium hydroxide makeup in the contact zone so as to maintain the desired pH of at least 12.

DETAILED DESCRIPTION OF THE DRAWING

For a better understanding of the invention, there is shown in the FIGURE a flow sheet of one embodiment of the inventive process. The flow sheet illustrates the combined removal of hydrogen sulfide from a gaseous stream, the production of ammonium polysulfide in an electrolytic cell, and the oxidation of said ammonium polysulfide to sulfur in a heating zone with recycling of the aqueous solution utilized as a carrier for the sulfur products produced in the contact zone and the electrolysis cell. With reference to the FIGURE, there is shown a contact zone 4 into which a mixture of hydrogen sulfide and a hydrocarbon gas are fed through line 2. The contact zone contains an aqueous solution of ammonium hydroxide at a pH of 12 or above as an absorbent for the hydrogen sulfide. Upon contact, the hydrogen sulfide is converted to ammonium sulfide and the first aqueous enriched solution produced is fed through line 5 to the anode compartment of an electrolytic cell 7 having a direct current power supply 8, anolyte compartment 29 and catholyte compartment 27. Ammonium polysulfide is produced in the anolyte compartment of said cell to form as an anolyte a second enriched aqueous solution. Ammonium hydroxide together with ammonium polysulfide produced in the anode compartment are withdrawn from the cell through line 32 and pass either through line 34 or through line 28, respectively, back to the contact zone or to a heating zone supplied with an oxygen containing gas through line 25. The heating zone 6 is maintained at atmospheric pressure and generally at the boiling point of the anolyte feed solution. Vaporized hydrogen sulfide, water, and ammonia exit through line 24 and are fed from the catholyte compartment of the cell through line 20 back to the contact zone 4. The anolyte solution together with elemental sulfur exits the heating zone 6 through line 21 and sulfur is filtered from the anolyte solution in zone 16 and removed from the system at line 17. The anolyte, free of elemental sulfur, is thereafter recycled through line 14 either back to the catholyte compartment of the electrolysis cell or to the contact zone 4 through line 20.

The electrolysis cell which is maintained at ambient temperature and pressure is provided with an anolyte containing ammonium sulfide which is fed to the anolyte compartment from the contact zone 4 of the process. The catholyte is an aqueous solution of ammonium hydroxide. Interposed between the anode and cathode of the cell is a cell membrane 10 which preferably allows the passage of ammonium ions but does not permit the passage of water through the membrane. Permselective or polymeric ion exchange membranes are well suited for this purpose and are well known in the art. Further description thereof is deemed unnecessary herein. The anode and cathode are connected to the positive and negative poles respectively of a suitable direct current source 8. The direct current source can be a battery or other suitable means such as a DC generator or rectified alternating current source. The anode can be a porous anode, however, the anode need not be porous. For example, the anode can be formed of any suitable material such as porous carbon or graphite and can take the form of other structures such as screens, gauzes, and the like and be composed of materials such as titanium, nickel, stainless steel and platinum. The cathode can be porous or a nonporous single plate or screen of a conductive structure. For example, the cathode can be porous carbon or graphite or a nonporous plate or screen material or nickel, platinum, titanium, or stainless steel.

The catholyte is recycled to the contact zone 4 which is automatically maintained at a pH of at least 12 in spite of the tendency for the absorbed hydrogen sulfide to reduce the pH of the aqueous ammonium hydroxide solution utilized in the contact zone. The automatic pH control at a pH of at least 12 is a novel feature of the invention which eliminates or reduces the necessity for the addition of ammonium hydroxide to the contact zone from outside the system.

At a pH of at least 12, ammonium polysulfide is produced at the anode of the electrolytic cell. At a pH of less than 12, there is a tendency for formation of elemental sulfur in addition to ammonium polysulfide. The production of elemental sulfur can have a deleterious effect on a porous anode utilized in the anolyte compartment of the electrolytic cell since the elemental sulfur can cause plugging of the pores of the porous anode so as to make operation of the process impractical if not impossible. Where a nonporous anode is utilized, the formation of elemental sulfur in the anolyte compartment of the cell can reduce the efficiency of the anode by the formation of a coating of sulfur on the anode.

In the operation of the electrolysis cell at ambient temperatures and pressures, hydrogen, which exits through line 30, is produced at the cathode. The hydrogen is removed from the system and the enriched aqueous solution of ammonium hydroxide is recycled back to the contact zone. In the contact zone 4 when the hydrogen sulfide and another gas mixture contacts the aqueous solution of ammonium hydroxide, the hydrogen sulfide becomes ionized and forms a solution of hydrogen sulfide and ammonium sulfide in the aqueous solution of ammonium hydroxide. When the aqueous solution of ammonium hydroxide and ammonium sulfide is led to the electrolysis zone, the sulfide ions are electrolytically oxidized to polysulfide at the anode and at the same time hydrogen and hydroxide ions are produced at the cathode. The ammonium ions released in the anolyte migrate through the permselective membrane to the catholyte compartment of the cell wherein they form, with the hydroxide ions produced from the hydrolysis of water at the cathode, an enriched aqueous solution of ammonium hydroxide. As noted above, the electrolytes in the anolyte compartment and the catholyte compartment of the cell are not the same, the anolyte contains ammonium sulfide in addition to an aqueous solution of ammonium hydroxide while the catholyte merely contains an aqueous solution of ammonium hydroxide.

As described previously, the preferred permselective membrane prevents the flow of the ammonium hydroxide solution containing ammonium sulfide in the anolyte compartment of the cell to the catholyte compartment of the cell containing an aqueous ammonium hydroxide solution. This permits sending a solution of ammonium polysulfide through line 28 to the heating zone 6 for oxidation to elemental sulfur and the recirculation of the catholyte through line 20 to the contact zone 4. The cell membrane 10 can be a conventional cation selective membrane which not only is impervious to liquid flow but permits the transference of cations through the membrane and prevents the similar transference of anions. Such membranes can be formed from a cation exchange resin by casting the resin into the form of a sheet or membrane or by incorporating granules of the resin in a matrix comprising a binder such as polyethylene. The cation exchange membrane can have a representative permselectivity of about 0.9 and a conductivity of about 100 millioms per square centimeter or more. It will be recognized that these values are illustrative only and that membranes of lower permselectivity and conductivity can be used in the electrolytic cell of the process of the invention.

In addition to the use of the preferred permselective cation exchange membrane, the cell membrane can be formed of an electrically neutral membrane having a relatively low permeability so as to impede the flow of fluid from the anode or cathode compartment to the opposite compartment of the cell. In most instances, a permselective membrane will be the preferred membrane for use in the electrolytic cell of the invention, particularly where a high degree of efficiency is desired in the operation of the electrolytic cell. By way of illustration, the membrane can also be formed of one or more layers of a porous film of polypropylene with or without a supporting fabric layer attached thereto. Such a membrane will allow, without selectivity, the migration of anions and cations through the membrane but will prevent or at least strongly impede substantial fluid movement between the anode and cathode compartments of the electrolytic cell.

The following examples illustrate the various aspects of the invention but are not intended to limit its scope. Where not otherwise specified throughout this specification and claims, temperatures are given in degrees centigrade, and parts, percentages, and proportions are by weight.

EXAMPLE I

In order to illustrate the process of the invention, the following process was conducted on a laboratory scale. One liter of a nine molar ammonium hydroxide aqueous solution was introduced at a rate of 0.45 cubic feet per hour through a sparging tube. The ammonium hydroxide aqueous solution was saturated with hydrogen sulfide over a period of two hours or until the color of the solution turned yellowish-green as the result of the formation of ammonium sulfide.

The aqueous solution of ammonium hydroxide and ammonium sulfide was pumped at a rate of 250 milliliters per minute into the anolyte compartment of an electrolysis cell having a permselective membrane. The electrolysis cell was connected to a potential/current source of three volts/five amps which was applied between the anode and cathode of the cell utilizing a direct current power supply. At a pH of greater than 12, the ammonium sulfide was easily oxidized to ammonium polysulfide. The anolyte containing ammonium hydroxide and ammonium polysulfide in aqueous solution was passed either to a heating zone or back to the contact zone; the amount passed to the heating zone being dependent upon (1) the degree of conversion of the ammonium sulfide to ammonium polysulfide in the anolyte compartment of the electrolysis cell and (2) the rate of evaporation of the anolyte solution in the contact zone. In this example, 99% of the anolyte was passed back to the contact zone and 1% was passed to the heating zone. The temperature in the contact zone and the electrolysis zone was ambient temperature. The process was conducted in the contact zone and the electrolysis cell at ambient pressure.

In the heating zone, the temperature was maintained at the boiling point of the anolyte solution fed to the heating zone from the electrolysis cell. A temperature of about 95° centigrade was maintained in the heating zone. At this temperature rapid evaporation of ammonia and hydrogen sulfide from the anolyte solution occurs in the heating zone. These gases together with water vapor are fed back to the contact zone. The sulfur produced in the heating zone is filtered out of the aqueous solution of ammonium hydroxide. The heating zone was also provided with a stream of air which is sparged inside the heating zone at a rate of 3 cubic feet per hour. This stream of air helps to drive the ammonia and the water vapor out of the aqueous solution maintained at the boiling point of said solution in the heating zone and therefore helps to reduce the conversion time of the polysulfide solution to elemental sulfur. The yield of sulfur under the above conditions was 1.19 grams per hour.

EXAMPLE II control forming no part of this invention

Example I was repeated except that a stream of air was not used in the heating zone. The average yield of sulfur was 0.67 grams per hour.

EXAMPLE III control, forming no part of this invention

In order to demonstrate the effect of oxygen on the reduction of the time required for conversion of sulfide and/or polysulfide to elemental sulfur in the heating zone, the following process was conducted on a laboratory scale. Two liters of a five molar aqueous solution of ammonium hydroxide were saturated with hydrogen sulfide by sparging hydrogen sulfide gas (100% purity) at a rate of 0.45 cubic feet per hour over a period of two hours with constant stirring. Thereafter, this solution which contains a major amount of sulfide was divided into three equal portions. In the first portion heat was applied directly to the mixture without a stream of air sparging into the mixture. Forty-five minutes after boiling started, sulfur was seen in this mixture. The sulfur produced in this portion was found to be 0.55 gram.

EXAMPLE IV

Utilizing a second portion of the mixture described in Example III, this mixture was heated directly on a hot plate with a stream of air sparging in the mixture at a rate of three cubic feet per hour. Twenty minutes after heating started, sulfur particles started to appear in the solution. The amount of sulfur produced was found to be 0.69 gram.

EXAMPLE V

Utilizing a third portion of the mixture described in Example III, the mixture was electrochemically oxidized to a polysulfide solution in the anode compartment of an electrochemical cell with a voltage/current of three volts/five amps for a period of one hour. The formation of a polysulfide solution was evidenced by the changes in color of the solution from brown to darker brown during the electrolysis process. This mixture was then divided into two equal halves. One half was heated to boiling on a hot plate with a stream of air sparging at a rate of 3 cubic feet per hour into the solution. Sulfur particles appeared after 15 minutes. The sulfur produced from the solution was found to be 1.12 grams.

EXAMPLE VI control, forming no part of this invention

Utilizing the polysulfide solution produced in Example V, a second half of this solution was heated to boiling on a hot plate. No stream of air was sparged into the solution. After a period of thirty-five minutes sulfur particles started to be produced in the solution. The amount of sulfur produced was found to be 0.84 gram.

The embodiments of the invention in which an exclusive property or priviledge is claimed are defined as follows:

1. A continuous process for the removal of hydrogen sulfide from a gas mixture with the formation of a sulfur product comprising:
   (A) contacting said gas mixture in a contact zone with an aqueous solution having a pH of at least 12 and consisting essentially of ammonium hydroxide to produce a first enriched aqueous solution consisting essentially of ammonium sulfide, ammonium hydroxide, and hydrogen sulfide;
   (B) introducing said first enriched aqueous solution into an electrolytic cell operated at ambient temperature and pressure, said cell comprising an anode and an anolyte in an anolyte compartment, a cathode and a catholyte in a catholyte compartment, said anode and said cathode being separated by a cell membrane, wherein said anolyte consists of said first enriched aqueous solution and said catholyte comprises ammonium hydroxide;
   (C) passing an electric current through said cell to produce at said anode a second enriched aqueous solution, comprising a major proportion of ammonium polysulfide and a minor proportion of sulfur and to produce hydrogen at said cathode;
   (D) withdrawing and recycling a major proportion of said second enriched aqueous solution to said contact zone;
   (E) introducing a minor proportion of said second enriched aqueous solution to a heating zone maintained at the boiling point thereof, said heating zone being provided with a sparging stream of an oxygen containing gas, to produce sulfur and to remove ammonia and hydrogen sulfide therefrom;
   (F) recycling said ammonia and said hydrogen sulfide to said contact zone;
   (G) withdrawing hydrogen from said cathode compartment of said electrolytic cell; and
   (H) recycling said catholyte to said contact zone; and
   wherein said first aqueous solution is automatically maintained at a pH of at least 12 by recycling the aqueous liquid and ammonia from said heating zone and an hydroxide ion enriched aqueous solution of ammonium hdyroxide from the catholyte compartment of said electrolytic cell.

2. The process of claim 1 wherein said anolyte and catholyte of said cell are maintained at a pH of at least 12.

3. The process of claim 2 wherein about 75 to 99% by weight of said anolyte is withdrawn from said electrolytic cell for recycling to said contact zone.

4. The process of claim 3 wherein said contact zone is maintained at a ambient temperature and pressure.

5. The process of claim 4 wherein said heating zone is operated at a temperature at least at the boiling point of said second aqueous solution.

6. The process of claim 5 wherein said temperature in said heating zone is about 85° centigrade to about 125° centigrade.

7. The process of claim 6 wherein at least one of said anode and cathode of said electrolytic cell is porous.

8. The process of claim 7 wherein said anode and cathode are independently selected from the group consisting of carbon, graphite, titanium, nickel, platinum, and stainless steel.

* * * * *

UNITED STATES PATENT AND TRADEMARK OFFICE
CERTIFICATE OF CORRECTION

PATENT NO.   : 4,765,873
DATED        : August 23, 1988
INVENTOR(S)  : Dane Chang and Michael C. McGaugh It is certified that error appears in the above-identified patent and that said Letters Patent is hereby corrected as shown below:

Col. 1, line 23; "descructive distillation" should read --destructive distillation--

Col. 1, line 59; "perox process," should read --Perox process,--

Col. 2, line 61; "is dislosed" should read --is disclosed--

Col. 4, line 29; "of amonium" should read --of ammonium--

Col. 6, line 4; "material or nickel," should read --material of nickel,--

Col. 9, line 15; "or priviledge" should read --or privilege--

Col. 10, line 19; "hdyroxide from" should read --hydroxide from--

Signed and Sealed this

Twenty-eighth Day of February, 1989

Attest:

DONALD J. QUIGG

*Attesting Officer*     Commissioner of Patents and Trademarks